United States Patent [19]

Bradshaw

[11] 4,173,924
[45] Nov. 13, 1979

[54] PAINT SPRAY BOOTH WITH AIR SUPPLY SYSTEM

[75] Inventor: Norman F. Bradshaw, Surrey, England

[73] Assignee: Schweitzer Industrial Corporation, Madison Heights, Mich.

[21] Appl. No.: 882,345

[22] Filed: Mar. 1, 1978

[51] Int. Cl.² ............................................. F23J 11/00
[52] U.S. Cl. .............................. 98/115 SB; 118/326; 118/DIG. 7; 165/DIG. 12
[58] Field of Search ....................... 98/115 SB, 115 R; 126/299 D, 299 E; 118/326, DIG. 7; 165/DIG. 12; 55/DIG. 18, DIG. 36

[56] References Cited

U.S. PATENT DOCUMENTS

| | | | |
|---|---|---|---|
| 2,486,251 | 10/1949 | Braun | 118/DIG. 7 |
| 3,618,659 | 11/1971 | Rawal | 165/DIG. 12 |
| 3,926,249 | 12/1975 | Glancy | 165/DIG. 12 |
| 4,061,186 | 12/1977 | Ljung | 165/DIG. 12 |
| 4,122,834 | 10/1978 | Jacobs | 165/DIG. 12 |

Primary Examiner—Ronald C. Capossela
Attorney, Agent, or Firm—Krass & Young

[57] ABSTRACT

A paint spray booth which includes a system for supplying air thereto under controlled conditions, with a heat pump operated to produce cooling or heating adjustments to incoming air as required under summer or winter operating conditions. Heat is transferred into or out of filtered air exhausted from the booth into the evaporator or out of the condenser by various heat exchanger arrangements to improve the operating efficiency of the heat pump during heating or cooling, respectively. Dehumidification is achieved by cooling the incoming air to an appropriate dew point temperature and then reheating to achieve the proper supply temperature, which process is improved in efficiency by either an air-to-air heat exchanger which utilizes incoming air to reheat the air, or alternatively, by a pair of secondary air-to-liquid heat exchangers positioned on either side of the main heat exchanger to transfer heat from the incoming air to the dehumidified air. During heating, the secondary heat exchangers receive heated liquid circulated therethrough in succession such that the first heat exchanger preheats the incoming air prior to passing through the main heat exchanger preventing freezing during water spraying of the main heat exchanger. The second secondary heat exchanger supplies supplementary heat to the air after it has passed through the main heat exchanger. A two-stage exhaust air heat exchanger arrangement is used to enable heat extraction below freezing. A centralized system for conditioning the air supplied to a number of spray booths includes the use of hot and cold thermal accumulators through which are circulated the liquids from and to the various heat exchangers and the evaporator and condenser.

30 Claims, 7 Drawing Figures

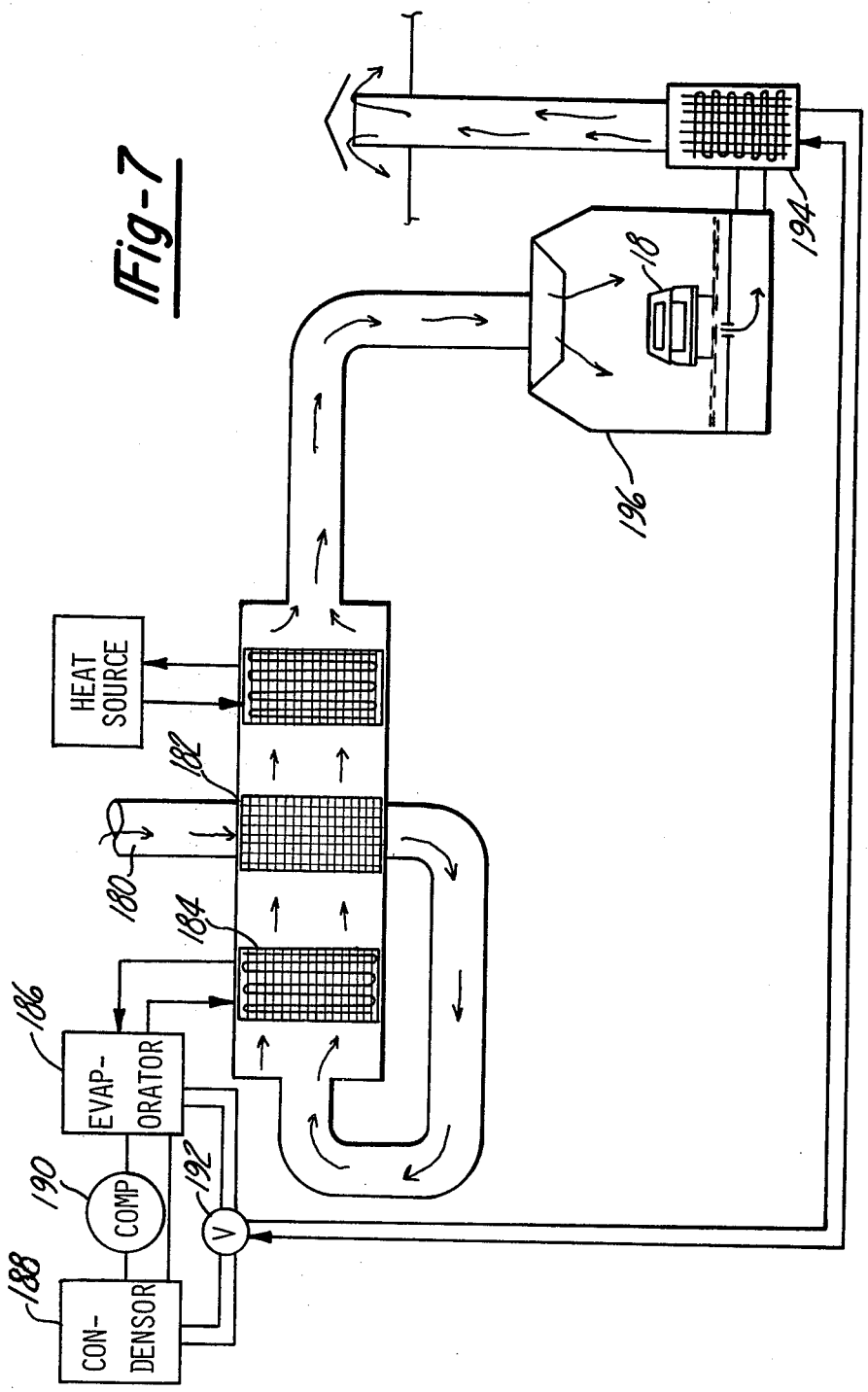

0
PAINT SPRAY BOOTH WITH AIR SUPPLY SYSTEM

BACKGROUND DISCUSSION

Paint spray booths are utilized in the high rate of production paint finishing of automobiles, trucks and other equipment to provide controlled environment conditions and to confine and eliminate the overspray paint solids. The vehicle bodies or other parts to be painted are moved through and into the paint spray booth enclosures where workers man spray guns or automated equipment is caused to apply the paint to the vehicle bodies. The design of modern industrial paint spray booths presents considerable difficulties due to energy, environmental and working condition requirements which have become more severe in recent years.

In order to remove paint overspray solids and solvents from the air, large volume extraction fans have traditionally been used which exhaust the air to the atmosphere while drawing in a fresh air supply. In order to eliminate the casual discharge of paint solids, in recent years highly efficient air washing units have been used to clean the air prior to its discharge. The relatively high volumes of air which are circulated in order to insure healthful working conditions require enormous energy in heating the air to a temperature compatible with the painting process as well as for the workers' comfort.

While the washing techniques have been successful in reducing the overspray solids contained in the air after passing through the paint spray bottles, the hydrocarbon solvents in gaseous form cannot of course be removed by the same process. The rigorous air pollution standards as to such pollutants have initiated a trend to the use of water-based paints, such as to eliminate the use of hydrocarbon solvents entirely to meet environmental restrictions placed on the discharge of such materials.

This use of water-based paints has complicated the problem of conditioning air supplied to the booth. That is, in order for proper application of water-based paints, the air in the booth must be within fairly limited ranges of both temperature and relative humidity.

In a typical installation, the air must be heated and humidified during cold weather conditions, and cooled and dehumidified during warm weather conditions. These processes have, by conventional practice, required extensive equipment and also large expenditures of energy in order to carry out the proper heating, cooling and adjustment of humidity conditions of the air supply.

For example, in warm weather operation, there would generally be some form of refrigeration unit utilized to chill brine circulated to a cooling coil to cool the incoming air to an appropriate dew point temperature, condensing out the necessary quantity of moisture to achieve the desired relative humidity at the higher temperature at which ultimately the air is to be delivered to the spray booth. In order to reheat the air to this temperature, a separate heating unit has been used to warm the air to this higher temperature. In addition, cooling towers were utilized in conjunction with the refrigeration unit in order to dissipate the heat absorbed from the incoming air. In heating the air, separate heaters are used in order to heat the air to the appropriate supply temperature at which the air is required to enter the spray booth.

Since such systems currently are required to be through systems, i.e., all air directed into the spray booth is exhausted into the atmosphere without recirculation, the energy expended in the cooling and heating of the air is lost to the outside.

A basic problem in transferring heat into or out of the exhaust air is to avoid fouling of the heat transfer surfaces with the remaining air borne solids given the enormous air flow rates required, which has presented insuperable maintenance requirements.

While extraction of heat from the spray booth exhaust air has heretofore been carried out, difficulties are also presented in extracting significant heat energy from the relatively low temperature air. In those situations where the air is filtered by being washed in a water bath, the evaporative cooling not only reduces the temperature of the air, it also produces a moisture laden exhaust air. Attempts to extract heat which reduces the air temperature below freezing would result in freeze up of the heat exchanger.

Thus, it is broadly the object of the present invention to provide an arrangement for conditioning the air by heating, cooling, humidifying, or dehumidifying the incoming air supply as appropriate in order to provide supply air to such paint spray booths at a controlled dry-bulb temperature and relative humidity, which is highly efficient in terms of the use of energy and equipment in carrying out the conditioning of supply air during both warm and cold weather conditions.

It is a further object of the present invention to provide an arrangement for efficiently utilizing the exhausted air from the paint spray booth either as a source of heat or as a heat sink such as to recover at least partially the energy involved in either heating or cooling the air.

It is another object of the present invention to provide improvements in the technique of heat extraction such as to efficiently utilize the heat content of the exhaust air at various booths such as to improve the overall efficiency of the process as well as to reduce the complexity of the equipment required.

SUMMARY OF THE INVENTION

These and other objects of the present invention, which will become apparent upon a reading of the following specification and claims, are accomplished by the recovery of energy expended in the conditioning of the air prior to its discharge to the atmosphere with minimum equipment, such as to enhance the efficiency of the process and reduce the complexity of equipment required to properly condition the air for the use water-based paint in industrial paint spray booths.

Specifically, this concept is carried out by an arrangement including the combination of a high-efficiency filtration of the exhaust air such that a high volume air-to-liquid heat exchanger may be utilized to extract heat from the air that has been warmed during cold weather operation and to utilize the exhaust air as a heat sink in order to more efficiently cool the incoming air during warm weather. Such energy recovery, according to the concept of the present invention, is achieved by combining an air-to-liquid heat exchanger with a refrigeration device operated as a heat pump. The efficiency of operation of the heat pump is improved by circulation of a liquid through the exhaust air heat exchanger into contact with the evaporator or condensor coils of the heat pump unit respectively when the unit is utilized to heat or cool the incoming air. The heating or cooling of the air is achieved by circulating a liquid through a main heat exchanger receiving the incoming air and also through either the condenser or evaporator coils to either heat or cool incoming air.

According to one refinement of the invention, the extraction of heat from the exhaust air is enhanced by the use of a two-stage heat exchanger in which the exhaust air is initially cooled to a temperature just above freezing, prior to being passed over a second stage heat exchanger which is sprayed with an anti-freeze liquid to thereby enable the exhaust air to be cooled well below the freezing point to extract a greater proportion of the heat energy of the air before discharge. Heated dry air can then be circulated over a coil sprayed with the anti-freeze solution in order to reconcentrate the anti-freeze solution.

To dehumidify the air, the incoming air is chilled to the appropriate dew point temperature and then reheated to the appropriate dry-bulb temperature.

In the preferred embodiment, this reheating is carried out by a pair of secondary air-to-liquid heat exchangers, one each located upstream and downstream of the main heat exchanger, with a liquid circulated between the heat exchangers serving to precool the incoming air and to reheat the chilled air. In this embodiment, the secondary heat exchangers receive warming liquid from a supplemental heat source during cold weather operation with successive circulation through the downstream and upstream exchangers such that the precooling heat exchanger acts as a preheater. This allows humidification to be carried out at the main heat exchanger by spraying water thereover since the air is preheated to above-freezing temperatures. The reheating coil is also supplied with warmed liquid from the supplemental source when the ambient air temperatures are not sufficiently high to provide an adequate source of reheat energy.

In a second embodiment, this reheating is carried out by means of an air-to-air heat exchanger over which is circulated the incoming air prior to just being chilled which allows the air to be reheated by means of the incoming uncooled air.

In a multiple spray booth installation, a central supply of the cooling and warming liquids utilized in the various aspects of the system are stored in hot and cold thermal accumulators, respectively, from which the liquid is circulated to provide a thermal accumulator for meeting the heating and cooling demands of the system and to act as a heat sink or source for transferring heat into or out of the exhaust air.

BRIEF DESCRIPTION OF THE DRAWINGS

FIG. 7 is a diagrammatic representation of an alternative embodiment of a reheater heat exchanger utilized in the air supply system shown in FIGS. 1 and 2.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Current standards for industrial paint spray booths preclude the recirculating of the air supply drawn or forced into the paint spray booth enclosures. That is, ambient air is adjusted in temperature and humidity, circulated through the paint supply booth, and then filtered to remove the solids introduced into the air by the paint spraying process prior to being discharged into the atmosphere. Underlying the concepts of the present invention is the recognition that if the air exhausted from the system could be returned to its initial condition, the only energy expended (other than in the fans, etc.) would be that required in pumping heat one way or the other prior to its entry into the paint supply booth. That is, if in returning to its original condition, energy recovery means were associated with the exhaust air to aid in either heating or cooling incoming air, the energy requirements of the air supply system for paint supply booths could be drastically reduced.

As mentioned in the "Background Discussion", the energy usage is currently enormous, given the huge volumes of air which are of necessity circulated through the paint supply booths.

While it has heretofore been proposed that simple heat recovery units be associated with exhaust air supply, the concepts of the present invention accomplish a much greater extraction of heat energy from the exhaust air and also enable the use of the exhaust air as a heat sink in order to substantially improve the efficiency of the cooling process, when operating conditions require cooling of the incoming air.

Figure 1:
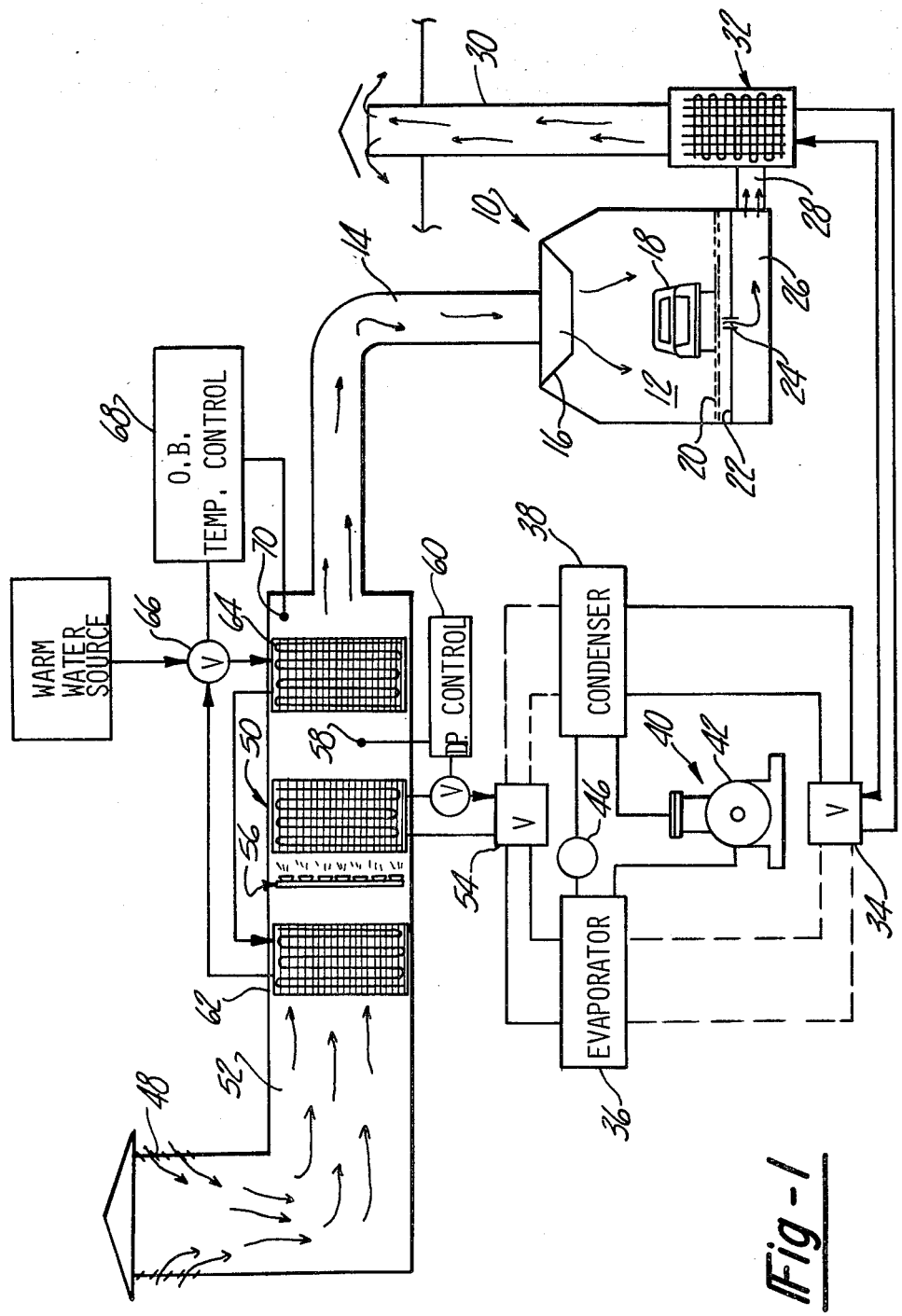
FIG. 1 is a diagrammatic representation of a paint spray booth air supply system according to the present invention under warm weather operating conditions in which the air supply is cooled prior to being circulated to the spray booth.

Referring to FIG. 1, a simplified diagrammatic representation of a paint spray booth 10 is depicted of a particular type, the details of which are disclosed in co-pending application Ser. No. 851,253, filed Nov. 14, 1977, assigned to the same assignee as the present application. The paint spray booth 10 includes an enclosure 12 through which is directed the air supply via an inlet 14, diffused in a diffusion plenum layer 16 so as to flow uniformly through the enclosure 12 past the car body 18 or other workpiece to be finished with paint. The air so supplied is first conditioned by either cooling or heating, and dehumidifying or humidifying to given temperature and humidity conditions prior to being supplied to the enclosure to achieve the proper psychrometric conditions for paint spraying operations with water-based paints. The conditioning means to achieve this end is described below.

The floor of the paint spray booth 10 comprises a rigid grating 20 under which is positioned a floor pan 22, containing a quantity of water, with a plurality of central cylindrical outlets 24 provided which extend above the floor pan 22 bottom level such that the water will continuously flow into the floor pan 22 and create a weir effect. In addition, vanes are sometimes provided which cause increased turbulence of the air and atomization of the liquid as they exit through the cylindrical outlets 24 to cause a scrubbing effect on the exiting air passing through the interior of the outlets 24. The air passing out through the outlets 24 is collected into an underspace 26 and passes out through an outlet 28 and thence to an exhaust stack 30. This process carries out a very effective filtration of the exiting air such that the solids in the air are removed at an efficiency level on the order of 99.85% removal rate.

It is this high efficiency solids removal rate which enables realization of the concepts according to the present invention with a high degree of heat extraction and transfer into and out of the exhaust air supply. That is, a high air flow rate heat transfer 32 is required which receives the exhaust air and through fin arrays or other such arrangements enable the transfer of heat into or out of the exhaust air. If high efficiency filtration means is not utilized, the rapid build up of a coating and covering of the fin surfaces would impede heat transfer and clog the air passages such that the process would be rendered inoperative or greatly reduced in effectiveness.

The exhaust air heat exchanger means 32 comprises an air-to-liquid heat exchanger means which serves to transfer heat into or out of the exhaust air into a liquid circulated through the air-to-liquid exhaust air heat exchanger means 32. Suitable such designs are available commercially, such as a fin-on-tube array.

The liquid, which should be an appropriate low freezing point substance (such as brine), when circulated within the tube structure transfers heat into or out of the air circulated over the fin array.

According to the concept of the present invention, the liquid so circulated is caused to flow through distributor valving 34 to either an evaporator 36 or condenser 38 of a heat pump means indicated generally at 40, including a mechanical compressor 42 and refrigerant circulated via lines 44 through the condenser 36 and evaporator 38. The heat pump may be a mechanical refrigeration unit in which compression of a suitable refrigerant by the compressor 42 is circulated to the condenser 38 to serve to absorb the heat caused by the compression and condensation of the refrigerant in the condenser 38, which is then circulated to an evaporator 36, usually through an expansion valve 46 where the expansion of the refrigerant causes absorption of heat into the evaporator 36 prior to its circulation back into the compressor 42 to continue the process in the manner very well known in the art. Other refrigeration devices such as absorption cycle units could be utilized.

The presence of the relatively high temperature condenser 38 and the low temperature evaporator 36 is utilized as a means for extracting the heat from the exhaust stack 30 during cold weather operation and to reject the heat from the condenser 38 during warm weather operation, both of which serve to considerably improve the efficiency of the heat pump operation.

In warm weather operation depicted in FIG. 1, the distributor valving 34 causes the liquid circulated in the heat exchanger means 32 to be circulated through the condenser 38 such that the process of giving up heat required in the condenser 38 is enhanced to reduce the vapor pressure against which the compressor 42 must operate to thereby reduce the power requirements to operate the compressor 42.

In the air supply system, the incoming air supply is drawn in through an intake 48 by means of a blower (not shown) and caused to pass over a succession of heat exchanger means.

The main heat exchanger means comprises an air-to-liquid heat exchanger 50 positioned within the duct 52. Liquid is circulated either about the evaporator 36 or the condensor 38, and is either chilled or heated thereby and thence circulated through the air-to-liquid heat exchanger means 50 to either heat or cool the incoming air. A distributor valve 54 serves to direct the liquid flow for either heating or cooling operation.

In FIG. 1, there is depicted warm weather operation in which the inlet air is cooled. The liquid flow is about the evaporator 36 and then through the main heat exchanger means comprising the air-to-liquid heat exchanger 50. The needs of the booth air supply are such as to require the air to be reduced in temperature to a given temperature and a proper humidity level maintained. Typically, this would be to a dry-bulb temperature of 75° F. and a wet-bulb temperature of 62° F. While a range of temperatures and relative humidity are allowed, generally the temperature levels require a reduction in temperature during typical warm weather operating conditions and often a reduction in relative humidity level.

This reduction in humidity level may be achieved by chilling the air to a temperature below the final temperature, which temperature is at an appropriate dew point so as to in turn correspond to the appropriate humidity level upon reheating to the final booth supply temperature.

If the humidity of the incoming air is such that the air is saturated at the corresponding dew point temperature, the humidity level is accordingly directly achieved upon reheating.

If the humidity level of the incoming air is below that which is required, the chilled air is saturated by means of a spraying of the main heat exchanger means 50 in which the air is chilled to the selected dew point temperature. The spraying is carried out by a spray nozzle array 56 positioned to spray water over the air circulated over the main heat exchanger 50 to cause the air to be saturated upon leaving the main heat exchanger means 50.

The chilling of the air and spraying thereof is carried out by the system controls, including a wet-bulb temperature sensor 58 positioned downstream of the main heat exchanger means 50 which provides a control signal for the dew point controller 60 to control the flow of chilled liquid to the main heat exchanger means 50 to chill the incoming air to the appropriate dew point temperature.

Since this dew point temperature is necessarily below the dry-bulb temperature required for the spray booth air supply, the air which is cooled in the main heat exchanger means 50 is reheated. This reheating, according to one of the concepts of the present invention, is carried out by first and second secondary heat exchanger means 62 and 64, respectively. The first secondary heat exchanger means 62 comprises an air-to-liquid heat exchanger through which the incoming air is passed upstream of the main heat exchanger means 50 while the second secondary heat exchanger means 64 is positioned downstream of the main heat exchanger means 50 such as to receive the air flow after being cooled therein.

A liquid is circulated through both the first and second secondary heat exchanger means 62 and 64, such as to cause a transfer of heat during cooling operation from the first secondary heat exchanger means 62 to the second secondary heat exchanger means 64. This produces both a precooling of the incoming air in the first secondary heat exchanger means 62 and a heating of the air subsequent to its passing over the main heat exchanger means 50. That is, the cooled air after passing over the heat exchanger means 50 chills the liquid circulated therein, which chilled liquid when circulated in the first secondary heat exchanger means 62 causes the incoming air to be precooled. This in turn heats the liquid circulating in the first secondary heat exchanger means 62 to thus cause the chilled air to be reheated at least partially by the heat of the incoming air in order to achieve the appropriate dry-bulb temperature prior to entry into the paint spray booth enclosure 12.

Under high temperature conditions of the incoming air, i.e., 100° F., the quantity of heat extractable from the incoming air is typically sufficient in order to achieve the appropriate reheat temperature.

For part-load conditions, a supplemental heating means will typically be required which could be comprised of warm water heated from an external heat source which is circulated together with the recirculated liquid circulated through the first and second secondary heat exchanger means 62 and 64 under the control of a modulating valve 66. The modulating valve 66 is in turn controlled by a dry-bulb temperature sensor 68 which in sensing the reheated temperature downstream of the second secondary heat exchanger means 64 by means of a temperature sensor 70 provides a control signal serving to allow adjustment of circulation through the modulating valve 66 to maintain the appropriate downstream dry-bulb temperature.

This recirculating allows the enhancement of efficiency of the dehumidification process in that instead of simply reheating the air after being cooled to its dew point in the main heat exchanger means 50 by a separate energy source, the incoming air is utilized as a heat source for this purpose. Taken with the corresponding precooling of the air prior to its entry into the main heat exchanger means 50, this substantially reduces the energy required in dehumidification.

The use of the exhaust air passing out from the paint spray booth enclosure 12 serves as a heat sink in which to reject the heat which must be extracted from the air in order to reduce its temperature to the appropriate dry-bulb temperature by means of the air-to-liquid heat exchanger means 32. This thereby serves to improve the efficiency of the heat pump means 40 by reducing the vapor pressure against which the compressor must operate in compressing the refrigerant in the condenser 38.

It has been calculated that this savings results in a power reduction of approximately 20% of the power required to operate the compressor 42. Additionally, this eliminates the cooling towers which are normally utilized to reject the heat of the condenser 38 to the atmosphere. Thus, not only is there an improvement in efficiency, inasmuch as the power requirements are reduced, but there is an elimination of a considerable equipment expense in the elimination of the cooling towers.

Further advantages accrue from the particular arrangement of the first and second secondary air-to-liquid heat exchanger means in conjunction with the heating mode of operation.

This arrangement further does not require any increase in the equipment required inasmuch as a preheater is typically required during cold weather operation and the first secondary heat exchanger may also act as a preheater.

Figure 2:
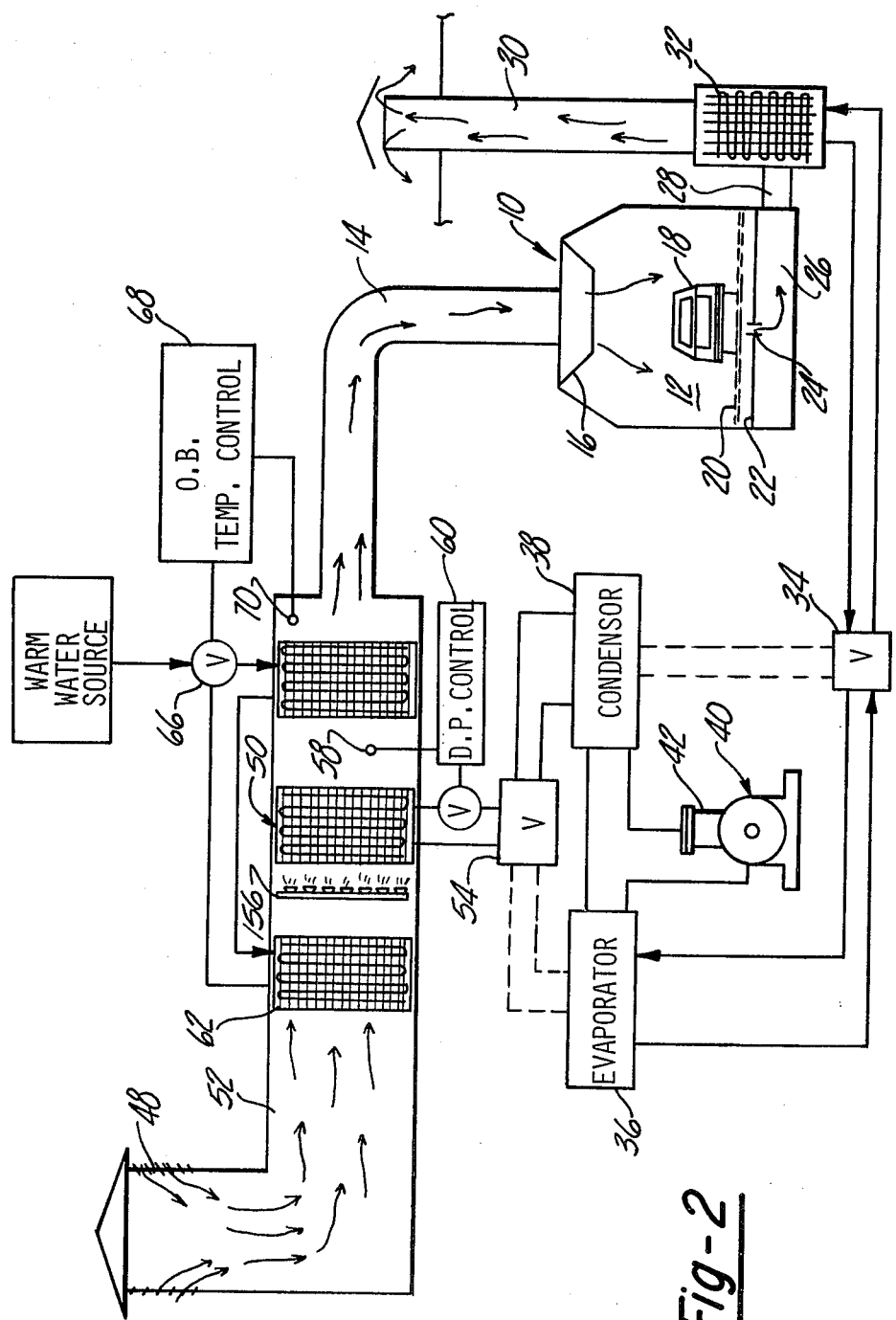
FIG. 2 is a diagrammatic representation of the paint spray booth air supply system depicted in FIG. 1 in the cold weather operating conditions in which the air supply is heated.

Referring to FIG. 2, the components depicted in FIG. 1 are shown in their cold weather mode of operation in which heating of the inlet air is required. In this case, the distributor valveing 34 causes circulating of the liquid through the exhaust air heat exchanger means 32 to be circulated about the evaporator 36 such that heat is provided to the evaporator 36. In this case, the liquid circulated through the main heat exchanger means 50 is circulated about the condenser 38 of the heat pump means 40 to provide the heating energy required to warm the air received in duct 52.

In this mode of operation, the first and second secondary heat exchanger means 62 and 64 are utilized as a heating means for heating the inlet air. A first secondary heat exchanger means 62 operates as a preheater to raise the temperature of the incoming air to a level well above freezing such that the humidification process will be carried out by means of the spray nozzle array 56 and may take place without creating freeze-up of the main heat exchanger 50.

This heating is carried out by circulating of a warm liquid as from a heated liquid source first through the second secondary heat exchanger means 64 which acts to raise the temperature of the air exiting the main heat exchanger means 50 to the final dry-bulb temperature under the control of the modulating valve 66 and the dry-bulb temperature sensor 68.

The circulating liquid is still at a relatively elevated temperature with respect to the incoming air and thus upon being circulated through the first secondary heat exchanger means 62 acts as a preheater for the inlet air.

Accordingly, these same elements which are utilized in the warm weather operation of FIG. 1 are also utilizable in the cold weather operation to accordingly provide the same number of components both providing complete usage of the system components to reduce the over equipment requirements.

The extraction of heat from the exhaust air via the air-to-liquid heat exchanger 32 provides similar improvements in efficiency of the heat pump means as in its use as a heat sink. This accordingly provides an "energy recovery" means which transfers heat into or out of the exhaust air in conjunction with the heating or cooling of the inlet air to enhance the efficiency of the process while eliminating the equipment required.

It should be understood that under the operating conditions referred to above as warm weather and cold weather cooling and heating of the inlet air will be required, but cooling and heating may both be required during transitional seasons.

It is noted that the passage of the air supply through the filtration means comprised of a water-air mixing in the cylinder outlets 24 in effect produces an evaporative cooling of the outlet air which corresponds to the evaporative cooling taking place in conventional cooling towers. This effect is of course advantageous in the context of the cooling operation since the outlet air is further cooled to provide a more effective heat sink for absorbing heat from the condenser of the heat pump means 40 via heat exchanger 32 and the circulated liquid and a very efficient operation may be achieved in a cooling operation.

However, this change in condition during heating operation renders the achievement of energy recovery somewhat more difficult in that the moisture and temperature conditions of the filtered exhaust air renders this process of heat extraction more difficult.

Figure 3:
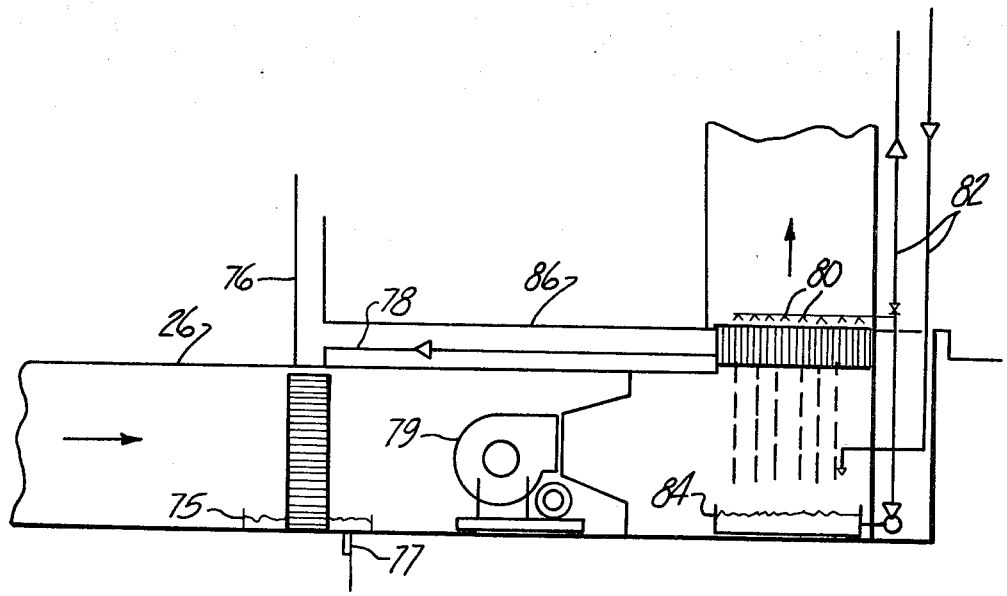
FIG. 3 is a diagrammatic representation of a two-stage heat extraction arrangement utilized in the system depicted in FIGS. 1 and 2.

Accordingly, a two-stage heat exchanger means may be utilized as depicted in FIG. 3. The exhaust air passing through the outlet 28 is successively passed through a first stage air-to-liquid heat exchanger 72 and thence through a second stage air-to-liquid heat exchanger 74.

The first stage air-to-liquid heat exchanger 72 is designed to reduce the temperature of the exhaust air to a point just above freezing such as to extract a large proportion of the moisture content of the air in liquid form prior to being passed into the second stage heat exchanger 74. The condensed moisture is collected in a condensate tray 75 as indicated to be communicated to a drain 77. The liquid circulated therethrough in lines 76 and 78 is thus warmed by the exchange of heat with the exhaust air after passing through the first stage heat exchanger 72 to extract a portion of the heat energy of the exhaust air.

Blower 79 forces the exhaust air across the second stage heat exchanger 74 which is comprised of a sprayed coil heat exchanger in which an anti-freeze solution such as ethylene glycol is sprayed onto the heat exchanger surfaces by means of a spray nozzle array 80, communicating with supply and return lines 82 to circulate the anti-freeze liquid from a reservoir (not shoown) and a collection tray 84.

The anti-freeze liquid accordingly forms a solution with moisture condensed in the second stage heat exchanger means 74 to prevent it from freezing and blocking the second stage heat exchanger means 74.

Thus, the temperature of the air may be further reduced substantially below freezing to extract a further proportion of the heat energy in the exhaust air, i.e., the temperature reduced to temperatures on the order to 20° F. or lower. The liquid circulated in lines 76 and 78 also is circulated via line 86 through the second stage heat exchanger means 74 so as to be initially warmed therein and then circulated through the first stage heat exchanger means 72 and further be warmed to recover the heat in two stages. This allows the transfer of heat from moisture laden exhaust air to be extracted to a point well below freezing, i.e., 20° F. without freeze up.

Figure 4:
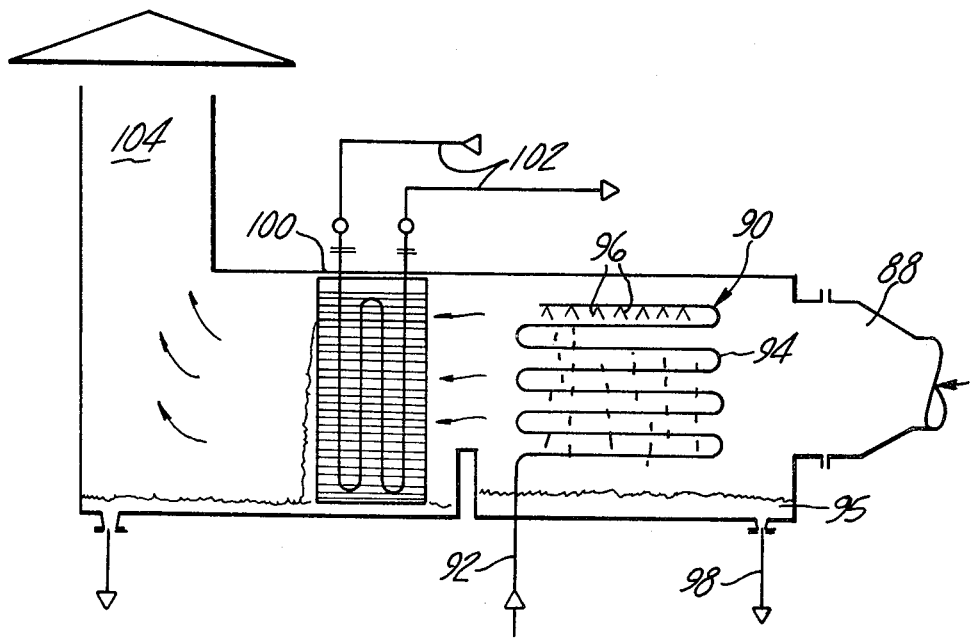
FIG. 4 is a diagrammatic representation of a reconcentration arrangement utilized with the two-stage heat extraction arrangement shown in FIG. 3.

The formation of the water anti-freeze solution of course requires that the water be periodically removed from the solution in order to allow continuous reuse of the anti-freeze liquid. An arrangement for carrying out such reconcentration is depicted in FIG. 4, in which warm dry air, received via ducting 88, is caused to pass over a reconcentration coil 90. The anti-freeze water solution received in line 92 is circulated through coils 94 which heat the solution. After being so heated, the solution emerges from a nozzle array 96 to be sprayed downwardly over the coils 94 to allow the hot air ducting to be in direct contact with the solution. This results in the moisture being absorbed in the hot dry air and allow collection of the reconcentrated anti-freeze in the floor pan 95 to be returned to the second two-stage heat exchanger 74 via line 98.

Additional heat may be recovered from the hot air in ducting 88 in a secondary heat exchanger 100 downstream of the reconcentration coil 90. Heat exchanger 100 may comprise an air-to-liquid heat exchanger in which liquid circulated via inlet and return lines 102 may be warmed prior to final discharge of the air through an exhaust outlet 104.

The hot air ducting 88 may be received from a source of waste heat elsewhere in the paint finishing operation as from the oven heater exhausts. The warmed liquid circulated in inlet and return lines 102 may be circulated for use in the air supply system according to the present invention for supplemental heat in the reheater exchanger 64.

In copending application, Ser. No. 887,156, filed Mar. 16, 1978, an efficient system for recovery and use of a large number of otherwise unrelated sources of low grade heat is disclosed in detail and, as noted therein, may be advantageously integrated with the air supply system according to the present concept. However, such broad energy management system is not essential for the carrying out of the concepts according to the present invention.

Figure 5:
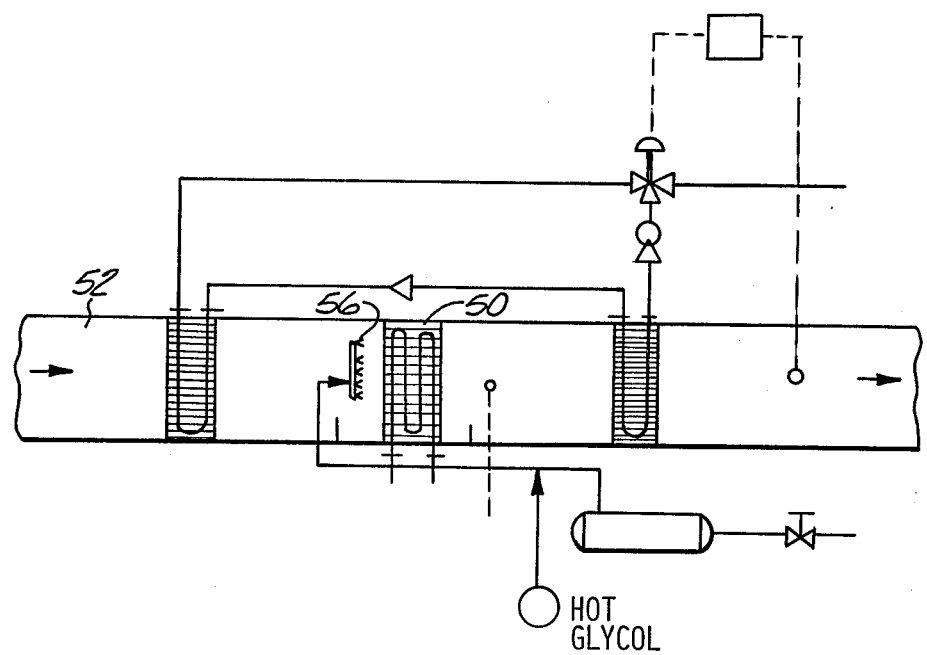
FIG. 5 is a diagrammatic representation of an alternative reconcentration arrangement to that shown in FIG. 4.

An alternative arrangement for reconcentrating the liquid anti-freeze solution is shown in FIG. 5 in which the main heat exchanger 50 is also sprayed with the hot mixture of liquid anti-freeze such that the humidification process carried out in the spray nozzle array 56 serves to cause the moisture content in the solution of the liquid anti-freeze to be absorbed by the inlet air to cause the same to be reconcentrated by the passage of inlet air thereover. This also serves to enhance the dehumidification of the incoming air and the main heat exchanger 50.

The spray booths as used in the produced of automotive vehicles normally consist of a number of spray booth sections joined together. In such installations, the spray booths according to the present invention, are provided with the cooling and heating liquids utilized during heating and cooling operations thereof from a common heat pump source. This installation is depicted diagrammatically in FIG. 6. In this case, a plurality of spray booths are depicted at 120 joined in end-to-end relationship with individual air supply inlet ducting including the main and secondary heat exchanger depicted at 122.

The exhaust air is collected in an underfloor extract void 124. The car bodies are adapted to be moved in succession via a conveyor indicated at 128 through each of the spray booths 120. Each of the main and secondary heat exchangers 122 includes the components described in FIGS. 1 and 2. That is, the air intake 130 collects and draws in air successively passing the same through a first secondary heat exchanger 132, a main heat exchanger 134 and a second secondary heat exchanger 136.

According to this arrangement, the liquid supplied to each of the main heat exchanger 134 and the first and second secondary heat exchangers 132 and 136 is supplied from central thermal accumulator tanks 138 and 140. Thermal accumulator tank 138 consists of a tank of liquid (water or brine) at cold temperature and a thermal accumulator tank 140 consists of a tank of liquid at relatively warm temperature. Liquid from the cold accumulator tank 138 is circulated through the evaporator 142 while the warm accumulator tank 140 is circulated through the condenser 144. Circulation pumps 146 and 148 are provided for this purpose.

The accumulatoor tanks 138 and 140 provide a thermal accumulation to provide the cold or warm liquids for either cooling or heating operations as determined by the mode of operation of the air supply system such that upon demand, the necessary flow can be achieved. The flow is caused to be directed from either the cold accumulator tank 138 or the warm accumulator tank 140, depending on whether cooling or heating operations are to be carried out by means of a series of diverter valves 150, 152, 154, and 156, such that when cooling demands are called for, the cold liquid is circulated into each of the main heat exchangers 134 and returned to the cold accumulator tank 138.

The action of the modulating valves 158 controls the flow in accordance with the control system demands.

Separate circulating pumps 160 are provided to circulate the liquid through the main heat exchangers 134.

Similarly, warm liquid flow to the first and second secondary heat exchangers 132 and 136 from the warm accumulator tank 140 is controlled with the modulating valves 162 in accordance with the reheat control sensing dry-bulb temperature. Circulating pumps 164 also circulate the brine or other liquid through the first and second secondary heat exchangers 132 and 136.

Figure 6:
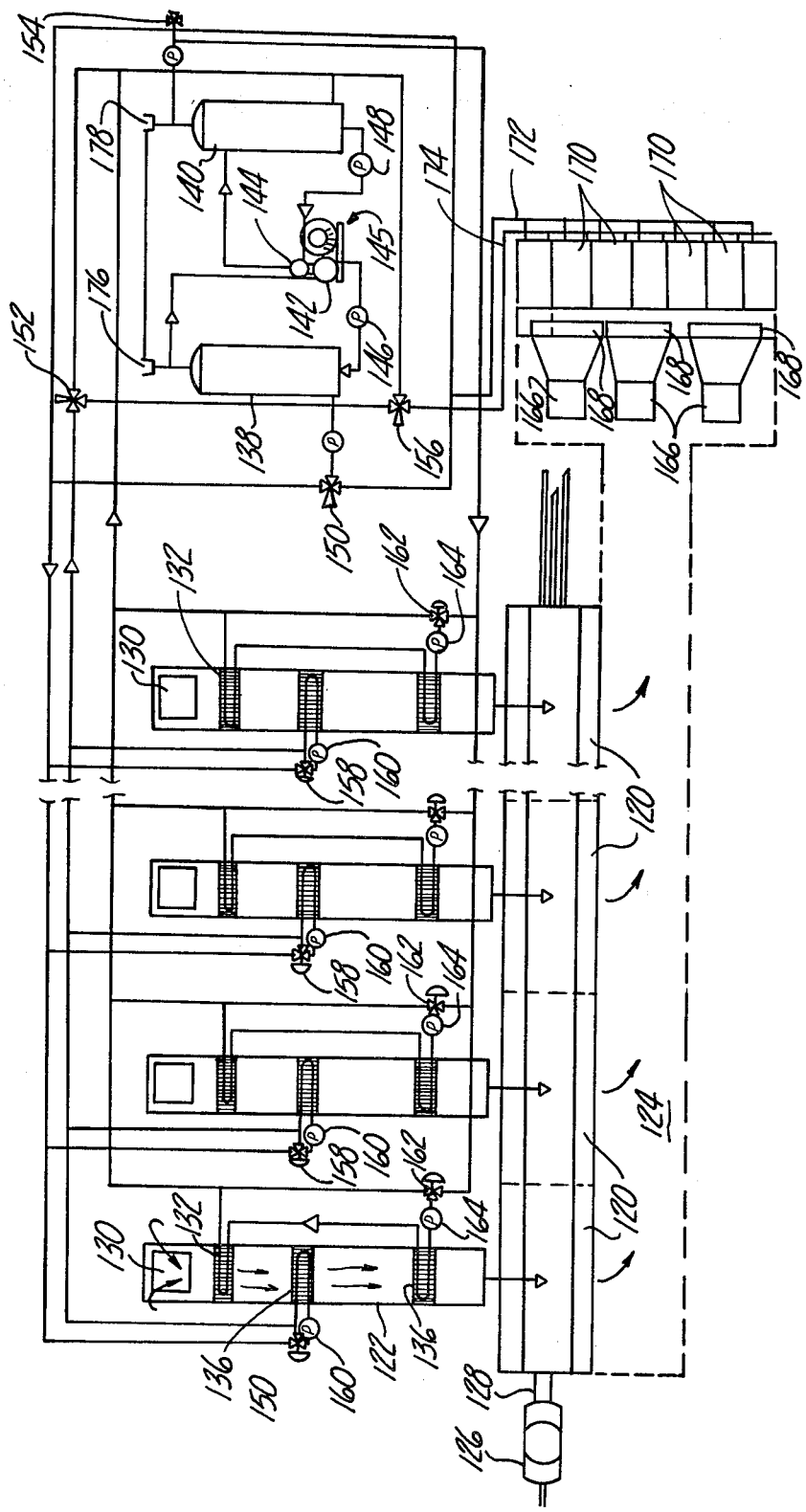
FIG. 6 is a diagrammatic representation of an air supply system for a series of connected paint supply booths.

In accordance with the concepts described above, the major feature of the present invention is the energy recovery achieved by the transfer of heat to and from the exhaust or extract air and as indicated in FIG. 6, the exhaust air which may be extracted by blowers 166 is passed over a two-stage heat exchanger means as described above, having a first stage heat exchanger 168 and a series of second stage heat exchangers 170. The liquid circulated around the first and secoond stage heat exchangers 168 and 170 is collected via lines 172 and 174 and diverted so as to flow into the cold accumulator tank 138 or the warm accumulator tank 140, depending on the cooling or heating mode of operation in the above-described circumstances with the aid of the diverting valves 156 and 154. This arrangement provides a stable supply of hot and cold liquid and continuously transfers heat from the exhaust heat exchanger means into or out of the condenser 144 or evaporator 142, respectively.

Expansion tanks may also be provided at 176 and 178 to insure that the system is filled with liquid throughout the temperature range of the liquid and the resulting expansion thereof.

It is noted that the independent control of the reheating afforded by the modulating valves shown in FIG. 6 allows independent control of the psychrometric conditions within each of the spray booth sections such that for various stages of the paint finishing operation carried out in spray booths, different humidity conditions may be maintained.

Referring to FIG. 7, an alternate form of the dehumidification portion of the supply system is depicted in diagrammatic form. In this arrangement, the inlet air is received through ducting 180 and is first circulated over an air-to-air heat exchanger 182 and thence circulated around and over a main heat exchanger 184, which in the cooling operation receives chilled brine or other liquid. The heat pump condenser 190 transfers heat into a liquid circulated therearound received from the distributor valving 192. The distributor valving 192 controls the flow of liquid from the exhaust air heat exchanger 194 which transfers heat from or into the air exhausted from paint spray booth 196, serving to heat or cool this circulated liquid as in the above-described embodiments.

In this embodiment, the supply air, after being chilled in the main heat exchanger 184, is reheated by means of an air-to-air heat exchanger 182 which is warmed by the incoming air received in the ducting 180. Thus, it directly transfers the heat from the incoming air precooling the same, by entering the main heat exchanger 184 and thereby reheating the air after being chilled to the appropriate dew point in the main heat exchanger 184.

The advantage of the liquid-to-air heat exchangers previously described arises from size limitations on commercially available air-to-air heat exchangers as the air-to-liquid type are of a more compact size when used in these applications.

In addition, the use of the first and second secondary air-to-liquid heat exchangers provide an advantage in that they are utilizable during heating operation to thereby simplify the system. Accordingly, the first-described system constitutes the preferred embodiment.

It should be noted that many of the details of the elements of these systems have been omitted for the sake of clarity and simplicity, i.e., circulating pumps, blowers, filters, louvering, etc., as well as the details of the control system inasmuch as the same may be of conventional design and do not comprise the present invention.

It can thus be seen that the arrangement according to the system described provides for a means for transferring heat to or out of the air exhaust after it has passed through the high efficiency filtration means associated with the paint spray booths such that a high volume air-to-liquid heat exchanger may be utilized to either conduct heat from the air into the heat pump means condenser, or out of the evaporator into the air.

Accordingly, the energy required in either heating or cooling the incoming air may be largely recovered from the exhaust air to improve the overall efficiency of the air supply system. At the same time, the components normally required in order to reject heat from the heat pump during cooling are eliminated, i.e., the cooling towers.

Further, the above arrangement realizes another efficiency derived from the heating, i.e., heat transferred from the incoming air before it is passed through the main heat exchanger means to reduce the energy required to achieve reheat.

Additionally, the two-stage heat exchanger allows continued extraction of heat from the exhaust air to reduce its temperature to well below freezing even though the exhaust air is initially at relatively low temperatures and is moisture laden, having passed through the water filtration utilized to filter the air.

The dual mode heat pump operation allows the use of a single heat pump arrangement to provide the cooling and heating, respectively, of the inlet air, and at the same time, to serve as a heat transfer means for transferring heat into or out of the exhaust air and into or out of the inlet air to thereby reduce the power and equipment requirements.

The embodiments of the invention in which an exclusive property or privilege is claimed are defined as follows:

1. A paint spray booth including an enclosure for carrying out spray painting operations therein and an air supply system, said air supply system comprising:
   means directing an incoming air supply into said enclosure;

means exhausting said air after passing through said enclosure;

filtration means filtering said air after passing through said enclosure removing paint overspray solids therefrom prior to being exhausted;

conditioning means for heating or cooling said supply air to a predetermined temperature level to supply said air to said enclosure at said temperature level;

energy recovery means receiving air exhausted from said spray booth enclosure, and including:

means for transferring heat from said supply air to said filtered exhaust air when said conditioning means air cooling is in operation; and further including means for transferring heat from said filtered exhaust air into said supply air when said conditioning means air heating is in operation;

whereby said system energy efficiency is increased by said heat transfer.

2. The paint spray booth according to claim 1 wherein said conditioning means for heating or cooling said incoming supply air includes:

heat pump means including an evaporator and a condenser, and means for evaporating and condensing a refrigerant, respectively, in said evaporator and condenser to produce cooling of said evaporator and heating of said condenser;

means for cooling said incoming air by transfer of heat from said incoming air into said evaporator;

means for heating said air supply by transferring heat out of said condenser into said incoming air; and wherein said energy recovery means includes means for alternatively transferring heat from said exhaust air into said evaporator to said exhaust air when said cooling means is in operation;

further including means for transferring heat from said exhaust air into said evaporator when said heating means is in operation;

whereby said transfer of heat into and out of said exhaust air during said cooling and heating means operation is achieved by said means transferring heat to and from said heat pump means evaporator and condenser.

3. The paint spray booth according to claim 2 wherein said means for transferring heat into and out of said exhaust air comprises:

heat exchanger means;

means circulating said exhaust air over said heat exchanger means;

said heat exchanger means including means circulating a fluid through said heat exchanger means and alternatively over either said heat pump means evaporator or condenser;

whereby heat is transferred into or out of said exhaust air to yield increased efficiency of said conditioning means in cooling or heating, respectively, the incoming supply air.

4. The paint spray booth according to claim 3 wherein said conditioning means for cooling or heating said incoming supply air comprises a main heat exchanger;

means for circulating a fluid alternatively from said heat pump means evaporator or condenser through said main heat exchanger means.

5. The paint spray booth according to claim 4 wherein said air supply system conditioning means includes dehumidification means comprising:

control means causing said cooling means to reduce the temperature of said incoming air to a dew point temperature corresponding to said humidity level in said air supplied to said enclosure;

whereby moisture above said humidity level is condensed out of said incoming supply air;

reheat means increasing the temperature of said dehumidified air to said predetermined temperature level in excess of said dew point temperature prior to introduction to said booth enclosure, whereby said humidity level is achieved.

6. The paint spary booth according to claim 5 wherein said reheat means includes means for transferring heat from said incoming supply air into said supply air after being cooled to said dew point temperature, whereby said incoming air is prechilled prior to being passed into said main heat exchanger means and said supply air leaving said heat exchanger means is increased in temperature by said heat transfer.

7. The paint spray booth according to claim 6 wherein said means for transferring heat from said incoming air to said air exiting said incoming air heat exchanger and said reheat means comprises an air-to-air heat exchanger in a position downstream of said incoming air heat exchanger means and means for passing said incoming air through said air-to-air heat exchanger prior to its entering said main heat exchanger, whereby said heat transfer is achieved.

8. The paint spray booth according to claim 6 wherein said means for transferring heat from said incoming air to said reheat means comprises a first liquid-to-air secondary heat exchanger located upstream of said main heat exchanger means and a second liquid-to-air secondary heat exchanger located downstream of said main heat exchanger means and means for circulating said liquid from said first secondary heat exchanger means through said second secondary heat exchanger means, whereby said heat transfer is achieved.

9. The paint spray booth according to claim 8 wherein said dehumidification means further includes a means for supplementing said heat transfer, including means circulating warmed liquid from said source into said second secondary heat exchanger means.

10. The paint spray booth according to claim 8 wherein said heating means further includes means for circulating a warmed liquid into said second secondary heat exchanger means and thence to said first secondary heat exchanger means, whereby said first secondary heat exchanger means preheats said incoming supply air prior to said entering said main heat exchanger means.

11. The paint spray booth according to claim 10 further including humidification means spraying water into said air at a point in said incoming air supply at said main heat exchanger means, whereby said first secondary heat exchanger means comprises a preheater to raise the temperature prior to carrying out humidification of said incoming air of said main heat exchanger means.

12. The paint spray booth according to claim 1 wherein said energy means comprises an air-to-liquid exhaust air heat exchanger means and wherein said exhaust air is circulated over said exhaust air heat exchanger, and further includes means for circulating a liquid through said heat exchanger and alternatively through either a cold liquid tank or a warm liquid tank during heating or cooling of said air supply, respectively, and further including means for circulating liquid from said cold and warm tanks over said heat pump means evaporator and condenser, respectively.

13. The paint spray booth according to claim 1 wherein said energy recovery means comprises a two-stage air-to-liquid heat exchanger means comprising a first stage air-to-liquid heat exchanger and a second stage air-to-liquid heat exchanger, means for causing said exhaust air to be passed successively over said first and second stage heat exchangers and further including means circulating a liquid within said first stage heat exchanger, reducing said temperature of said incoming air to a temperature above freezing, whereby any moisture condensed out of said exhaust air remains in liquid form, further including means for spraying said second stage heat exchanger means with an anti-freeze liquid forming a solution with condensed moisture and wherein said second stage heat exchanger means reduces said exhaust air temperature to a subfreezing temperature, whereby said heat transfer from said exhaust air may be carried out to reduce the temperature of said exhaust air below freezing without causing freezing of either of said first or second stage heat exchanger means due to freezing of condensed moisture from said exhaust air.

14. The paint spray booth according to claim 13 further including means circulating liquid successively through said second stage heat exchanger and thence through said first stage heat exchanger.

15. The paint spray booth according to claim 14 wherein said conditioning means includes heat pump means including an evaporator and a condenser, and refrigerant circulated therethrough, and including means circulating said liquid through said two-stage heat exchanger means and alternatively through said heat pump means evaporator during said heating means operation and alternatively through said condenser during said cooling operation, and wherein said air supply system further includes means for transferring heat into and out of said incoming supply air by heat transfer means between said evaporator and condenser of said heat pump means.

16. The paint spray booth according to claim 14 further including reconcentrating means for removing condensed water from said anti-freeze and water solution after being sprayed on said second stage heat exchanger means, whereby said condensed moisture forming on said second stage heat exchanger means may be removed to allow recirculation of said anti-freeze liquid.

17. The paint spray booth according to claim 16 wherein said anti-freeze liquid comprises ethylene glycol.

18. A paint spray system including a plurality of air paint booth sections positioned in adjoining relationship, each of said paint spray booth sections comprising enclosures for carrying out paint finishing operations therein and an air supply system, said air supply system including:
  means for introducing a supply of air into each spray booth section;
  means for filtering said air after passing through said spray booth section;
  means for exhausting said air after being filtered into the atmosphere;
  conditioning means for heating or cooling supply air introduced into each spray booth to a predetermined temperature level;
  said conditioning means including a plurality of main heat exchangers, each receiving supply air introduced into a respective spray booth section;
  central heat pump means including an evaporator and a condenser;
  means for circulating refrigerant therethrough to produce heating of said condenser by condensation of said refrigerant therein and cooling of said evaporator by evaporation of said refrigerant;
  said conditioning means including means for circulating a liquid through said evaporator and said condenser, respectively, to provide a quantity of heated and cooled liquid, respectively, and further including means for alternately circulating a proportion of said liquid circulated through said evaporator or said condenser through each of said main heat exchangers, whereby said air drawn into each of said spray booth sections is alternately cooled or heated;
  energy recovery means comprising an exhaust air heat exchanger means including an air-to-liquid heat exchanger and means for passing exhaust air from said paint spray booths therethrough and including means for circulating a quantity of liquid through said air-to-liquid heat exchanger means and into said quantity of liquid circulated alternately around either said evaporator or said condenser, said means circulating said quantity of liquid into said liquid evaporator when said conditioning means is circulating said liquid from said condenser into each of said main heat exchanger means and circulating said quantity of liquid in said air heat exchanger means into said condenser when said liquid circulated around said evaporator is circulated into said plurality of said main heat exchanger means.

19. The system according to claim 18 wherein said air supply system comprises modulating valve means associated with each of said main heat exchanger means for controlling the degree of cooling of said air passed into each of said air inlet means, whereby said cooling of said air supply to each of said plurality of said air paint spray booth sections is individually controlled at differing temperatures by said individual modulating valve.

20. The system according to claim 18 wherein said means for circulating liquid around said evaporator and said condenser includes a pair of liquid tanks and means for circulating and collecting said liquid circulated about said evaporator and condenser into said tanks.

21. The system according to claim 20 wherein said means for circulating said liquid into said exhaust air-to-liquid heat exchanger comprises means for circulating said liquid into one of said respective tanks, when said means causing circulation of said liquid through said exhaust air heat exchanger means, and through said evaporator and thereby heating said liquid circulating over said evaporator, and further including means for circulating said liquid circulated through said air exhaust heat exchanger means over said condenser and into said other liquid tank.

22. A method of providing an air supply for paint spray booths, said booths defining an enclosure wherein paint spraying operations are conducted, said method including the steps of:
  conditioning an air supply by alternately heating or cooling said supply air to achieve a given temperature of said air;
  introducing said air supply into said plant spray booth enclosure;
  filtering said air after passing through said enclosure;
  exhausting said filtered air;

transferring heat alternately into or out of said exhaust air during cooling or heating of said air supply, respectively;

utilizing said heat transfer in cooling or heating said incoming air, whereby said cooling or heating efficiency of said inlet air is enhanced.

23. The method according to claim 22 wherein said cooling of said air supply is achieved by heat pump means including an evaporator and a condenser, and a refrigerant circulated therein, and means to produce cooling of said evaporator and heating of said condenser by evaporation and condensation of said refrigerant, and wherein said cooling step includes the step of transferring heat out of said inlet air into said heat pump means evaporator, and wherein said heat transfer step includes a step for transferring heat from said condenser into said exhaust air, whereby said cooling efficiency is enhanced.

24. The method according to claim 22 wherein said step of conditioning said air supply further includes the step of controlling the humidity of said inlet air by cooling said air to a predetermined dew point temperature and reheating said air above dew point temperature prior to passing said air into said paint spray booth enclosure and wherein said reheating is carried out at least partially by the transfer of heat from said air supply prior to its being cooled to said predetermined dew point temperature, whereby said efficiency of said reheating process is enhanced.

25. The method according to claim 24 wherein said step of transferring heat from said supply air includes the step of transferring heat into a quantity of liquid circulated in an air-to-liquid heat exchanger and circulating said liquid into a second heat exchanger located downstream from the point whereat said air is chilled to said dew point temperature.

26. The method according to claim 23 wherein said step of transferring heat into or out of said air exhausted from said enclosure comprises the step of circulating a quantity of liquid through an air-to-liquid heat exchanger and causing said exhaust air to pass over said air-to-liquid heat exchanger and wherein said liquid is alternately circulated over either said heat pump means evaporator or condenser, depending on whether said supply air is being heated or cooled.

27. The method according to claim 26 wherein said step of transferring heat into or out of said exhaust air includes the step of transferring heat out of said exhaust air in two stages including circulating a liquid through a first air-to-liquid heat exchanger to reduce the temperature of said exhaust air to a point just above freezing and thence through a second air-to-liquid heat exchanger which subsequently receives said quantity of liquid circulated through said exhaust air heat exchanger, and wherein said second air-to-liquid heat exchanger is sprayed with an anti-freeze liquid forming a solution with condensed water to prevent freezing thereon and wherein said air exhaust temperature is reduced to a point below freezing, whereby said heat transfer may reduce said temperature of said air exhaust well below freezing without causing freezing of moisture condensed out of said exhaust air by said transfer of heat.

28. The method according to claim 23 wherein in said filtering step, said air exhaust is filtered at a filtration efficiency at least 99.85% achieved in removing a solid particulate from said exhaust air and wherein in said step of transferring heat out of said exhaust air, said exhaust air is circulated through said heat exchanger which receives said exhaust air and causes said heat transfer therebetween, whereby in said filtration step, clogging of said heat exchanger is thereby prevented.

29. An air supply system for an enclosure, said air supply system comprising:

means directing an incoming air supply into said enclosure;

means exhausting said air after passing through said enclosure;

filtration means filtering said air after passing through said enclosure removing solids therefrom prior to being exhausted;

conditioning means for heating or cooling said supply air to a predetermined temperature level to supply said air to said enclosure at said temperature level;

energy recovery means receiving air exhausted from said enclosure, and including:

means for transferring heat from said supply air to said exhaust air when said conditioning means air is in operation; and further including means for transferring heat from said exhaust air into said supply air when said conditioning means air heating is in operation;

whereby said system energy efficiency is increased by said heat transfer.

30. The air supply system according to claim 29 wherein said conditioning means for heating or cooling said incoming supply air includes:

heat pump means provided with an evaporator and a condenser, and means for condensing and evaporating a refrigerant in said condenser and evaporator, respectively, to produce cooling of said evaporator and heating of said condenser;

means for cooling said incoming air by transfer of heat from said incoming air into said evaporator;

means for heating said air supply by transferring heat out of said condenser into said incoming air; and wherein said energy recovery means includes means for alternately transferring heat from said exhaust air into said evaporator to exhaust air when said cooling means is in operation;

further including means for transferring heat from said exhaust air into said evaporator when said heating means is in operation;

whereby said transfer of heat into and out of said exhaust air ducting said cooling and heating means operation is achieved by said means transferring heat to and from said heat pump means evaporator and condenser.

* * * * *